(12) United States Patent
Boodaghians et al.

(10) Patent No.: US 11,858,830 B2
(45) Date of Patent: Jan. 2, 2024

(54) PORTABLE POTABLE WATER FILTRATION

(71) Applicant: MAG Aerospace Industries, LLC, Carson, CA (US)

(72) Inventors: Razmik Boodaghians, Glendale, CA (US); Darrel Hofmann, Anaheim, CA (US); Nguyen Tram, Chino Hills, CA (US); Timothy Birbeck, Torrance, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 84 days.

(21) Appl. No.: 17/339,206

(22) Filed: Jun. 4, 2021

(65) Prior Publication Data

US 2022/0388868 A1  Dec. 8, 2022

(51) Int. Cl.
*C02F 1/00* (2023.01)
*C02F 1/32* (2023.01)

(52) U.S. Cl.
CPC .............. *C02F 1/002* (2013.01); *C02F 1/325* (2013.01); *C02F 2201/002* (2013.01); *C02F 2201/008* (2013.01); *C02F 2201/326* (2013.01); *C02F 2209/40* (2013.01); *C02F 2301/08* (2013.01); *C02F 2303/04* (2013.01)

(58) Field of Classification Search
CPC ...... C02F 9/02; C02F 9/00; C02F 1/32; C02F 1/00; C02F 1/002; C02F 1/325; B01D 29/56; B01D 35/26; B01D 17/06; A61L 2/10; A61L 2/26
See application file for complete search history.

(56) References Cited

U.S. PATENT DOCUMENTS

| | | | |
|---|---|---|---|
| 4,871,452 A | 10/1989 | Kohler et al. | |
| 6,143,185 A | 11/2000 | Tracy et al. | |
| 7,666,317 B2 | 2/2010 | Hsueh et al. | |
| 9,061,923 B2 | 6/2015 | Hsueh et al. | |
| 10,675,569 B1* | 6/2020 | Geyer | C02F 9/005 |
| 2004/0222163 A1* | 11/2004 | Saccomanno | C02F 1/325 |
| | | | 210/748.11 |
| 2019/0062190 A1* | 2/2019 | Blad | C02F 9/005 |
| 2019/0092648 A1* | 3/2019 | Stricker | C02F 1/002 |
| 2020/0255300 A1* | 8/2020 | Murrell | B01D 29/56 |

FOREIGN PATENT DOCUMENTS

| | | | | |
|---|---|---|---|---|
| CN | 213157978 U | * | 5/2021 | |
| CN | 113748089 A | * | 12/2021 | B01D 29/15 |
| WO | WO-2009105763 A2 | * | 8/2009 | C02F 1/003 |

* cited by examiner

*Primary Examiner* — Walter D. Griffin
*Assistant Examiner* — Cameron J Allen
(74) *Attorney, Agent, or Firm* — Kilpatrick Townsend & Stockton LLP (57) ABSTRACT

A disinfection system for treating water. In a specific example, the system treats water prior to its upload to an aircraft or other passenger transportation vehicle. One or more replaceable filters are positioned within a filter chamber housing in order to expose water flowing through the system to filtration treatment.

11 Claims, 12 Drawing Sheets

PORTABLE POTABLE WATER FILTRATION

FIELD OF THE DISCLOSURE

According to certain embodiments of this disclosure, there is provided a portable water filtration and disinfection system for treating water. In a specific example, the system treats water prior to its upload to an aircraft or other passenger transportation vehicle. One or more replaceable filters are positioned within a filter chamber housing in order to expose water flowing through the system to filtration treatment.

BACKGROUND

Disinfection of water on-board passenger transportation vehicles is necessary to guarantee water quality. This may include disinfection of potable water that is held in a self-contained potable water tank onboard the vehicle. This may also include disinfection of water as it is uploaded to the vehicle. Water held in onboard water tanks is ultimately intended for delivery to beverage makers, sinks for handwashing, toilets for flushing, other water usage devices, or is otherwise routed on-board the vehicle for various forms of water use or consumption, such as humidifier, sprinkler system, and so forth. As one example, water systems on aircraft are complicated systems that usually include a tank with plumbing conduits and a pressurization system to deliver water to the various points of use.

The issue of water quality, and in particular, of potable water quality, on passenger transportation vehicles and equipment, such as aircraft, trains, boats and ships, and the like is a point of interest for regulatory authorities. Regulatory standards have been enacted that require water carried on-board passenger vehicles to meet certain standards such as the US EPA Aircraft Drinking Water Rule. Passenger airlines and other transportation companies must thus meet relevant drinking water standard(s). If failing to do so, the aircraft water system has to go through disinfection process per specified protocol and re-tested, accordingly. This can lead to the aircraft being grounded until re-testing of water quality and confirmation that the water management system is free of any microbial contamination takes place.

Airlines and other passenger transport vehicle companies must thus ensure that the potable water (i.e., drinkable water) carried aboard the aircraft is fit for human consumption by employing appropriate disinfection protocols and by preventing cross-contamination during water upload. Exemplary patents that are directed toward treating water upon upload to a passenger transportation vehicle such as an aircraft are described by U.S. Pat. Nos. 7,666,317 and 9,061,923, titled "Methods and Systems for Disinfecting Potable Water Supplies." These patents are owned by the present assignee and relate to treating/purifying water upon upload using chemical treatments and ultraviolet ("UV") light, respectively. These patents describe technology that is considered active water treatment.

Other patents have also sought to treat water that is carried onboard the vehicle. For example, U.S. Pat. No. 4,871,452 to Kohler, et al., entitled "On-Board Water Supply," discloses equipment for purifying waste water from galleys, sinks, and toilets of aircraft. Waste water from these areas discharges to a tank, after which it passes through a mechanical filter, a bed of active carbon, ozone and osmotic stages, and a disinfection stage involving addition of chlorine and irradiation with UV light. Thereafter, the water is made available to aircraft passengers for certain uses.

Discussed in U.S. Pat. No. 6,143,185 to Tracy, et al. are alternate systems for decontaminating waste water from aircraft toilets, sinks, and galleys. They too include a mechanical particulate filter, activated carbon, and a source of UV light. Alternatively, according to the Tracy patent, the waste water may be exposed to microwaves or treated with chlorine or iodine. A sensor may be used to measure the level of clarity of the treated water as an indication of its purity and restrict opening of a control valve until acceptable clarity levels are obtained.

However, the Kohler and Tracy systems and methods are directed at purifying wastewater. They are not directed toward treating potable water upon upload. Periodic disinfection conducted on board the vehicle does not address the issue of contamination that may be introduced in uploaded water, which is of particular concern for aircraft flying to and from, and being serviced in, non-industrialized areas. Existing treatment of drinking water prior being uploaded (or upon/during upload) to the aircraft mostly relies on to facilities available at a given airport. Therefore, reliability and consistency of water treatment will be varied from airport to airport and availability of resources. The present disclosure overcomes the issue of availability regardless of location because the disclosed treatment module is designed to actually travel with the aircraft and is used at any location where drinking water needs to be uploaded to the aircraft.

In addition, air must be introduced into the water storage and dispensing system on the aircraft in order to maintain pressurization, as well as to drain the system during routine servicing. This air can introduce pathogens that can multiply, and cause unsanitary conditions and unacceptable water quality in the intervals between samplings or disinfection procedures. In effect, because the water storage and dispensing system is routinely exposed to the outside environment, potable water quality cannot be ensured upon upload without some form of upload treatment. As a result, there remains a need in the art for an apparatus, method, and system for treating/purifying water before it is uploaded to the transportation equipment. There also remains a need in the art for an apparatus, method, and system for treating/purifying water that is portable, that travels with the aircraft itself, and that can be used regardless of the location of the aircraft.

SUMMARY

Accordingly, the present inventors have designed a portable potable water filtration system and device that seeks to prevent contaminated drinking water being uploaded to aircraft potable water tank. The system will safeguard the quality and purity of water loaded to the aircraft potable tank, as well as keep aircraft water system free of metallic and organic impurities. The reduction of impurities in the aircraft water system prevents scaling that can lead to changes in flow rate and pressure with time. Impurities in the aircraft water system can also change taste and color of water used for making on-board beverages, as well as warming food with moisturizing ovens. Water purity changes due to the presence of waterborne pathogens can potentially cause health-related hazards for passengers and the crew. The disclosed system and device can help address these problems.

In certain examples, there is provided a water filtration system for a vehicle, the system comprising a filtration chamber housing comprising an inlet and an outlet; the filtration chamber housing configured to receive a removable filter; a plurality of inlet fitting adapters that allow the inlet to receive upload water from differently-sized water delivery conduits; a filtration monitoring system; and a carrying case with a UV system to treat components of the water filtration system when not in use. The system may include a plurality of outlet fitting adapters. The filter may be a polymer-based material for passive filtration. The carrying case may have at least one space holder configured to receive the filtration chamber housing, the space holder comprising at least one UV LED, a closeable door, and a safety switch that only allows the UV LED to be activated only when the closable door is closed. The filtration monitoring system may be a screen with a plurality of indicators. The water filtration system comprises a plurality of filtration chamber housings. It is possible for the water filtration system to be mounted in series with a second water treatment system. In this example, the second water treatment system may be an active filtration system mounted on board the vehicle.

Other embodiments provide a dual filter water treatment system, comprising at least two filtration chamber housings; a flow control unit secured to the housings, the flow control unit defining a platform that supports an inlet, an outlet, at least one UV LED, and UV shields. The UV shields may be a first UV shield hinged to the platform at a first pivot point and configured to cover the inlet, and a second UV shield hinged to the platform at a second pivot point and configured to cover the outlet. The system may also be provided with a case configured to house the dual filter water treatment system.

A further embodiment provides a water treatment system housed in a case, the system comprising: at least one retractable inlet hose; at least one retractable outlet hose; and at least one filtration chamber housing configured to house a filter. In this example, the case may be a rolling case.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

DETAILED DESCRIPTION

Embodiments of the present disclosure provide a device for treating water upon upload. The device's water treatment is not chemical or UV-based. Instead, the device incorporates a physical filtration system into a housing that allows the device to travel with the aircraft and that can be used external to an aircraft skin. The device is a passive water treatment. It does not require electricity or power to function. (However, it should be understood that other components of the device described herein may use power for their operation, such as the germicidal UV light system and/or the filtration management system, described further below.)

Figure 1:
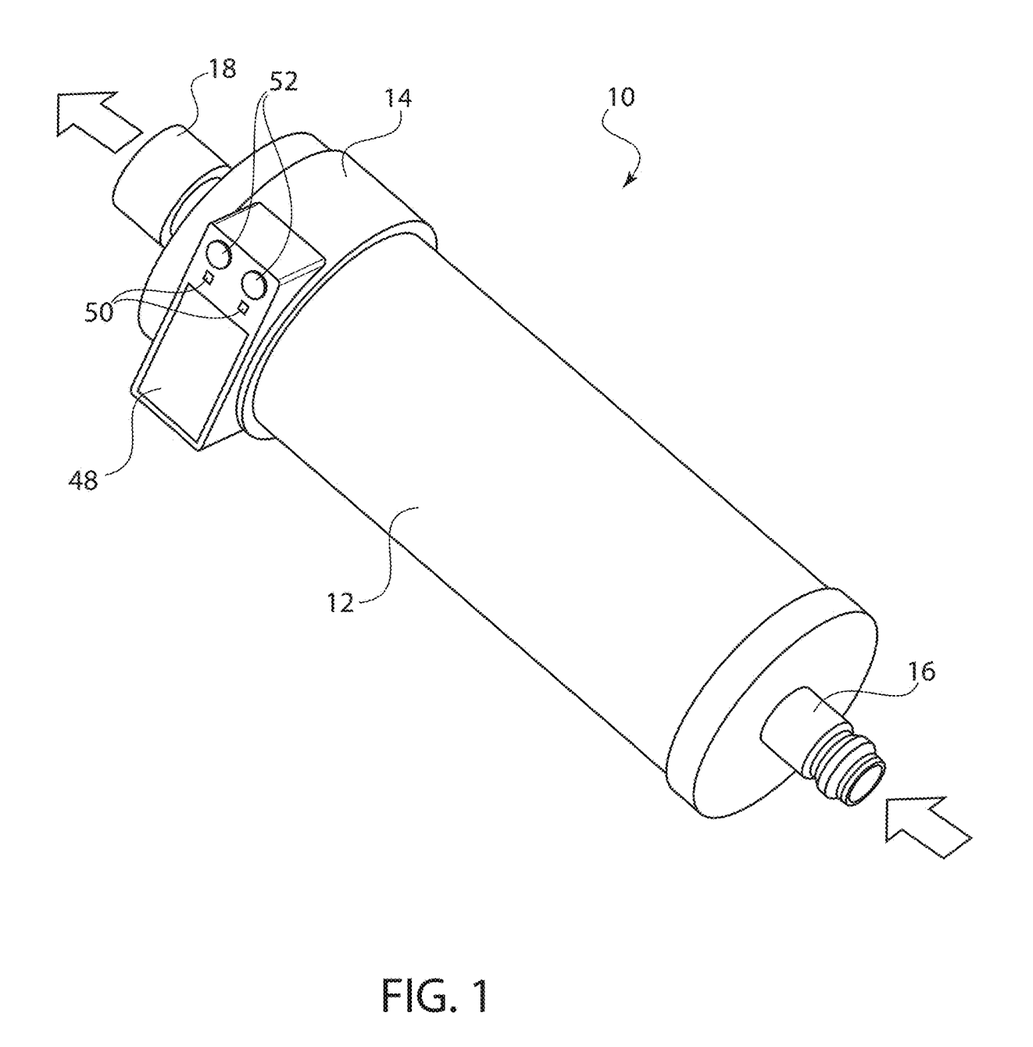
FIG. 1 illustrates a side perspective view of a water filtration device.
Figure 2:
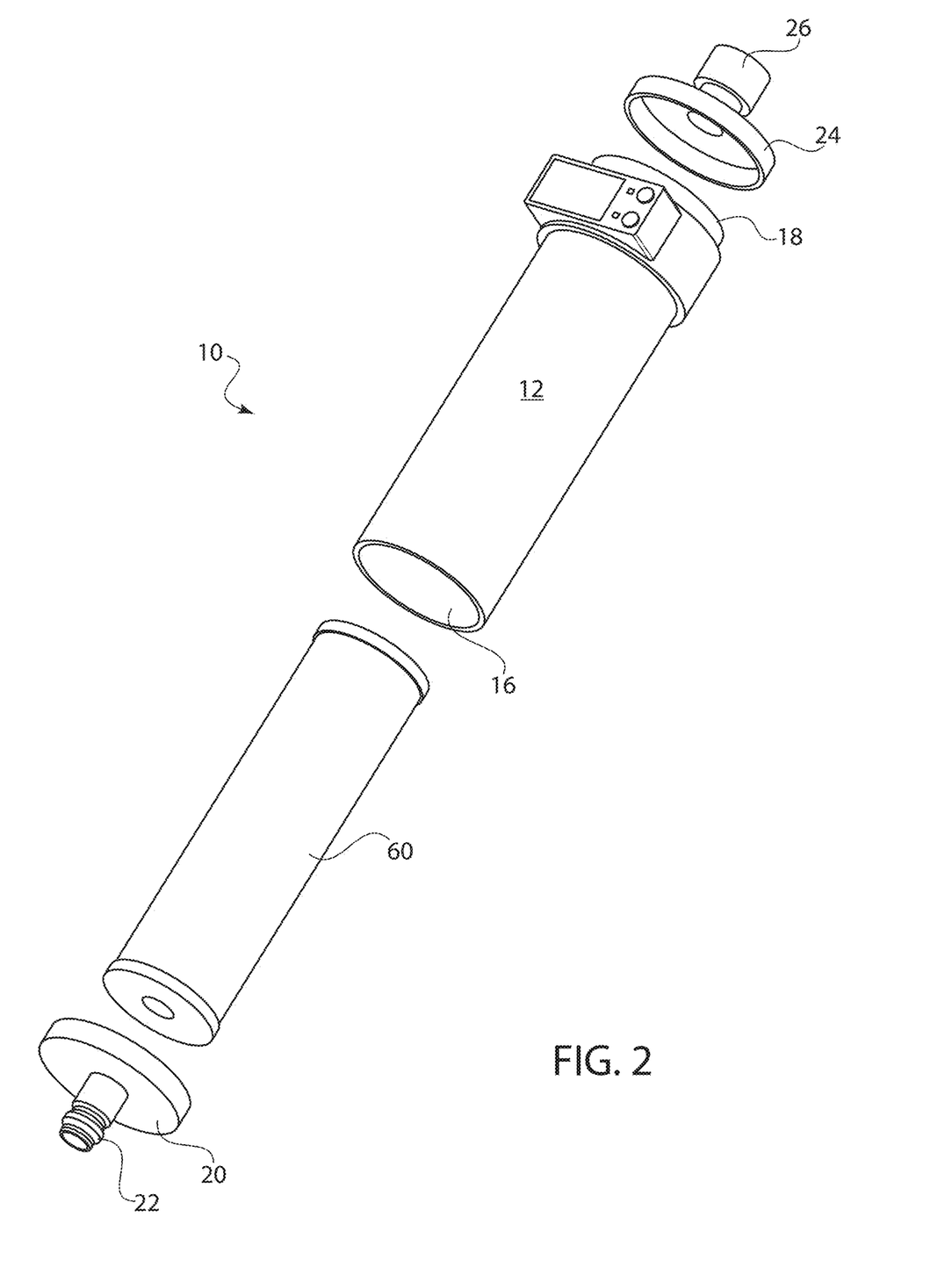
FIG. 2 illustrates an side exploded view of the water filtration device of FIG. 1.

There is disclosed a device 10 for water treatment and purification. Specific embodiments find particular use in connection with uploading potable drinking water to an aircraft or other passenger transportation vehicle. The device is designed to be portable. The treatment process is intended to take place at the aircraft water upload stage. As is shown by FIG. 1, the device 10 has body defined primarily by a filter chamber housing 12. A filtration monitoring system 14 is also associated with the filter chamber housing 12. Unfiltered water enters the device 10 at inlet 16, is treated by a filter 60 contained within the filter chamber housing 12, and filtered water exits through outlet 18. As shown by FIG. 2, the inlet 16 and outlet 18 may be provided with adapters or fittings may be removable and/or customizable in order to allow the device 10 to be modifiable for use with different types of water delivery systems. For example, it is possible to provide the device 10 with a plurality of differently-shaped inlet fitting adapters 20, such that the device 10 can cooperate with different types of water delivery hoses, depending upon the shape of the hose at a particular airport where service is taking place. The inlet fitting adapter 20 is designed to fit to the water inlet 16 of treatment filter cylinder housing 12.

The inlet fitting adapter 20 may have an adapter end 22 that cooperates with a water delivery hose via threading, via one or more clamps, dovetail and slot connection, quick disconnect connector, or via any other appropriate connection mechanism. The inlet fitting adapter 20 may be secured to the filter chamber housing 12 itself via threads, by a flanged interface, via hydro flow clamps, dovetail and slot connection, quick disconnect connector, or via any other appropriate securement system.

There may also be provided an outlet fitting adapter 24 that may be customized to match the aircraft/vehicle specific connections for the aircraft/vehicle with which it is intended to travel. The outlet fitting adapter 24 is designed to fit to the water outlet 18 of treatment filter cylinder housing 12 in order to allow connection to the aircraft (or other vehicle) water upload panel.

Although the device 10 is primarily designed to travel with the aircraft/vehicle on which it is intended to be used, various differently-sized outlet fitting adapters 24 may be provided with varied outlet adapter ends 26, such that the device may be moved from vehicle to vehicle if desired and used with different vehicle water upload systems. The outlet fitting adapter 24 may be secured to the filter chamber housing 12 itself via threads, by a flanged interface, via hydro flow clamps, dovetail and slot connection, quick disconnect connector, or via any other appropriate securement system. In short, the inlet 16 and the outlet 18 may be provided with a plurality of differently sized fitting adapters 20, 24 that may be customized to allow a wide range of use options for the device 10.

Figure 3:
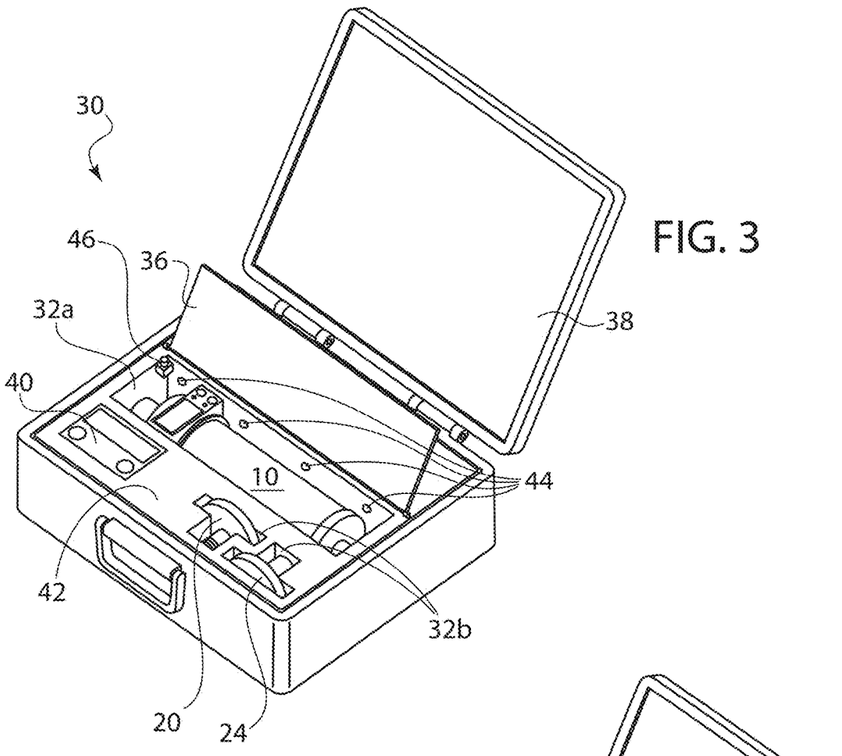
FIG. 3 illustrates a carrying case.
Figure 4:
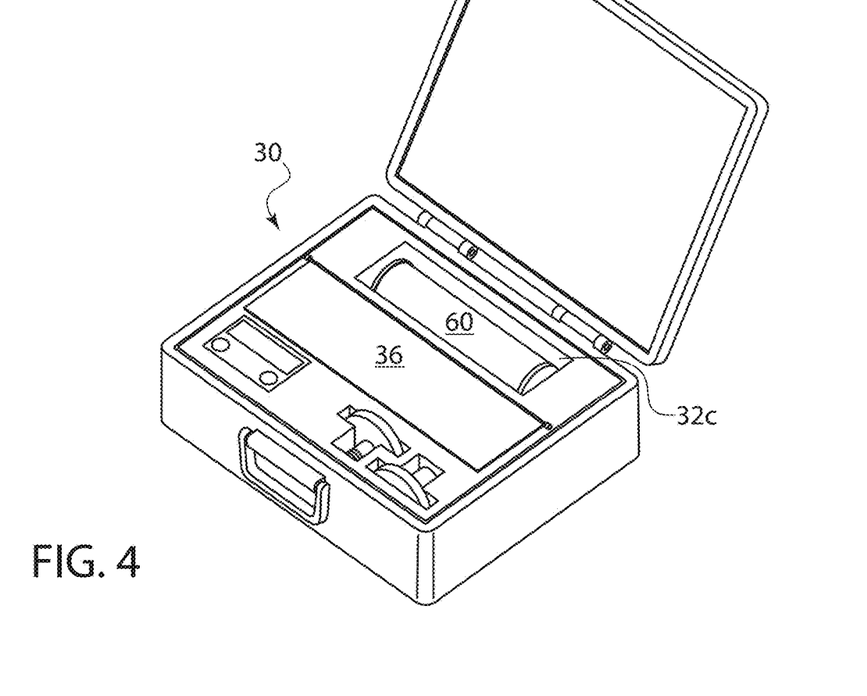
FIG. 4 illustrates the carrying case of FIG. 3 with compartment door closed.

In order to provide ease of moving the device 10 from vehicle to vehicle and/or in order to provide a safe place to store the device 10 and its accompanying fitting adapters 20, 24 on a specific vehicle with which it is intended to be used, there may be provided a specifically designed carrying case 30. One example is illustrated by FIGS. 3 and 4. Case 30 may enclose a one or more differently shaped adapters 20 that are configured to cooperate with the inlet 16 in order to connect the device 10 to the hose of a water delivery truck and/or one or more differently shaped adapters 24 that are configured to cooperate with the outlet 18 in order to connect the device 10 to the water system panel of the vehicle.

The carrying case 30 may be fitted with space holders 32 for each assembly component to prevent any movement during transportation. For example, the case 30 may have a first space holder 32a shaped to support the device housing 12, one or more space holders 32b to support the adapters 20, 24, one or more space holders 32c to support a spare filter cartridge 60, and/or space holders to support any other components that may be provided with the device 10 and desirably stored in the carrying case 30. Any desirable configuration may be used. The interior of the case 30 may be fitted with a rigid liner 42 that prevents rattling of the stored components. (In an alternate embodiment, the interior of the case may be fitted with a foam (or other appropriate material) that prevents rattling of the stored components.)

One or more of the space holders 32 may be provided with a compartment door 36. This may help further protect components contained within a specific space holder. In the example illustrated, a compartment door 36 is positioned over the space holder 32a that supports the device 10. The carrying case 30 may also be provided with a lid to 38 that may be locked closed in order to secure the carrying case 30.

The carrying case 30 may also be fitted with a germicidal UV LED system that can be turned on when the unit is not in use in order to treat components inside the carrying case 30 so that they are free of any microbial contamination for their next use. For example, it can be important to clean the components of the device between uses in order to prevent bacteria and other microbiological contamination from being transferred to the treated water. During use, the components of the device are in contact with a number of potential sources of contamination, such as workers coordinating water upload, bacteria in the natural environment, bacteria from the local water supply. Appropriately disinfecting components of the device between uses can help ensure that this contamination is removed and that the device is ready for a new use. The UV LED system may include one or more germicidal UV LEDs 44 positioned at various locations within the carrying case 30. In the specific example illustrated, the rigid liner 42 forms a space holder 32a with a compartment door 36. As shown, the space holder 32a is sized to support the device 10 (including the device housing 12 with an inlet fitting adapter 20 and an outlet fitting adapter 24 positioned thereon). After use of the device 10, it may be desirable to treat the device to ensure that the device, and particularly the adapters 20, 24 are not contaminated for the next use. These space holder 32 may thus be provided with one or more germicidal UV LED lights 44. After use, the device 10 may be positioned within the space holder 32, and the compartment door 36 closed. A safety switch 46 may cooperate with the compartment door 36 such that the door 36 must be closed in order for the germicidal UV LED system to operate. When the door 36 is opened, the germicidal UV LED light(s) will automatically turn off (In an alternate embodiment, the one or more germicidal UV LED lights are positioned anywhere within the carrying case 30 and the safety switch 46 may be associated with the carrying case lid 38.)

The germicidal UV LED system may be powered externally or internally. In one example, there may be provided a self-charging capacitor that generates electricity. In another example, the carrying case 30 may be provided with a chargeable battery that supplies the electrical energy for the operation of the LEDs. In a further example, the carrying case 30 may hook up to aircraft power for re-charging or for electricity. Available power for the UV LED system, the filtration monitoring system 14, or any other operating parameters can be reflected on screen 40.

Referring back to FIG. 1, the filtration monitoring system 14 (which may also be referred to as the FMS) is designed for mobile monitoring of the water quality either entering or exiting the device 10. It may be powered in any of the above-discussed ways. The FMS 14 may monitor the filtration flow rate, flow speed, incoming water quality, filtration quality, time to change the filter per recommended volume of water treated over time, or any other appropriate parameter. The FMS 14 has a screen 48 that displays these parameters. In a specific example, the FMS screen 48 is an LCD screen. The FMS 14 may have one or more status indicators 50, such as status LEDs. Status indicators 50 may indicate whether the system is on or off, whether battery power is sufficient, or any other parameter. The FMS 14 may communicate with the aircraft in order to make uploading more efficient. In a specific example, the FMS 14 may communicate with the aircraft wirelessly via Wifi, Bluetooth, or other appropriate technology. This can allow for remote monitoring of functioning of the device 10 through a mobile device. Examples for use of the FMS 14 may be to enable reduced power consumption if the water flowing into the device 10 is of sufficient quality that flow rate can be increased (which means less contact time of the water with the filter/filtration media). Alternatively, if the water flowing into the device 10 requires enhanced treatment, the FMS 14 can lower the flow rate in order to allow increase contact time of the water with the filter/filtration media. In one example, the FMS can communicate with the incoming water supply in order to change the flow rate. This allows the device to be more efficient and effective. This altered flow rate or other parameters (such as device on/off) may be input wirelessly. However, one or more multi-use buttons 52 may also be positioned on the FMS 14. These buttons may be on-off buttons, flow rate management buttons, or any other appropriate control buttons.

The filter 60 contained within the filter chamber housing 12 may be a passive filter. One specific example relies on the use of a polymer-based material. Other exemplary filter systems include but are not limited to filters using an ion exchange resin, natural polymer beads, small pore size ceramic filters, classic carbon filters such as activated charcoal filters, reverse osmosis filters, mixed media filters, such as filters using sand or other media, filters with a tortuous path, or any other appropriate filter system, or any combination of the above.

In one example, the filter 60 may be friction fit within the filter chamber housing 12. Additionally or alternatively, various types of internal connectors may be designed in order to secure the filter 60 in place within the filter chamber housing 12 if necessary. For example, there may be a lock and rotate connection between a groove and projection, such as a dovetail or J-lock connection. Additional connection examples include but are not limited to a bayonet fitting, ball and detent connection, snap connection, magnetic connection, or any combination thereof. Other connection options are also possible in considered within the scope of this disclosure.

Figure 16:
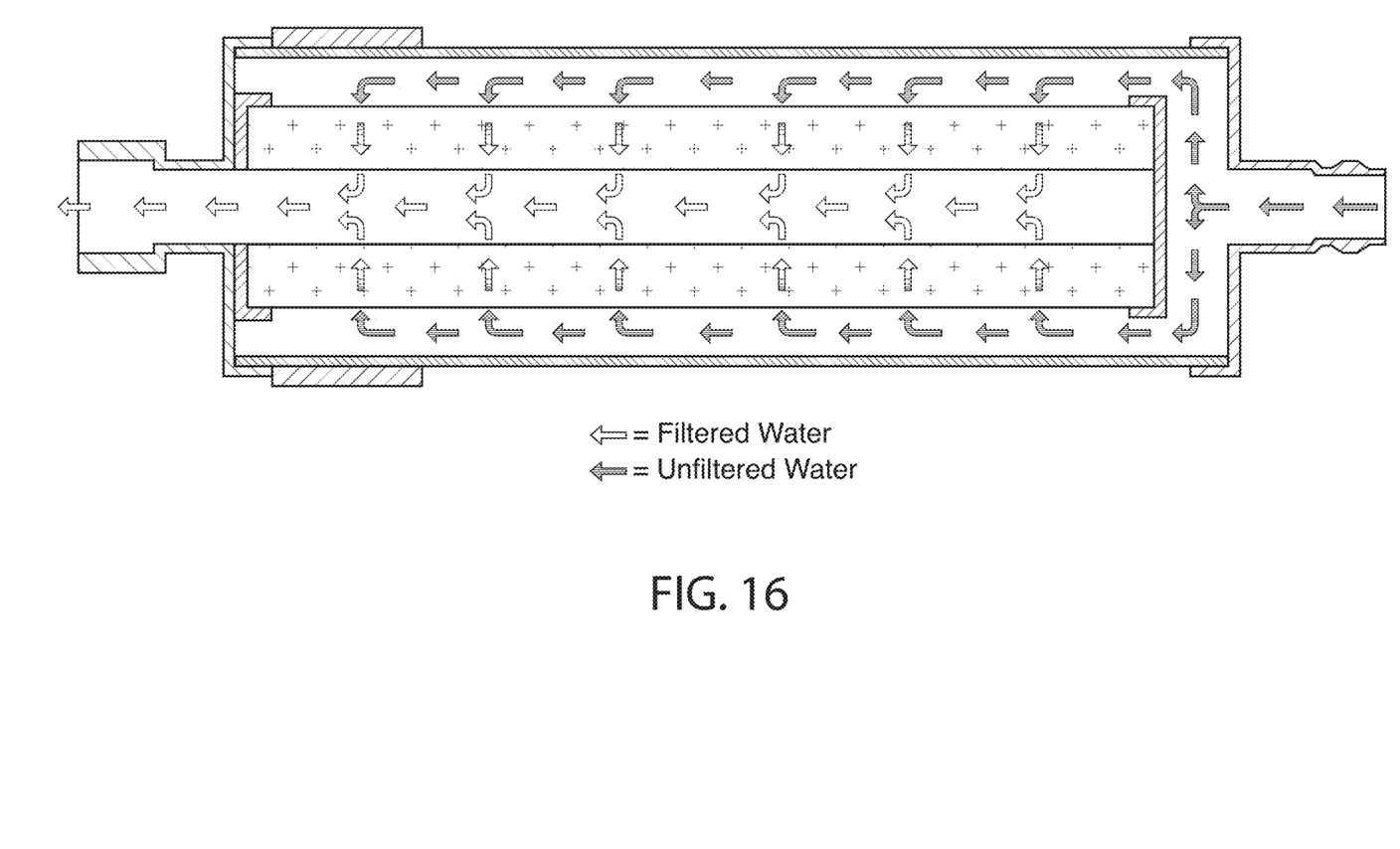
FIG. 16 illustrates a side cross-sectional view of water flow through a single filter embodiment.

FIG. 16 illustrates one embodiment of water flowing through the disclosed device for treatment. Arrows indicate the direction of water flow. The darkened arrows indicate unfiltered water, and the lightened arrows indicate treated, filtered water. Pressure from the incoming water source forces movement of the water through the system.

Figure 5:
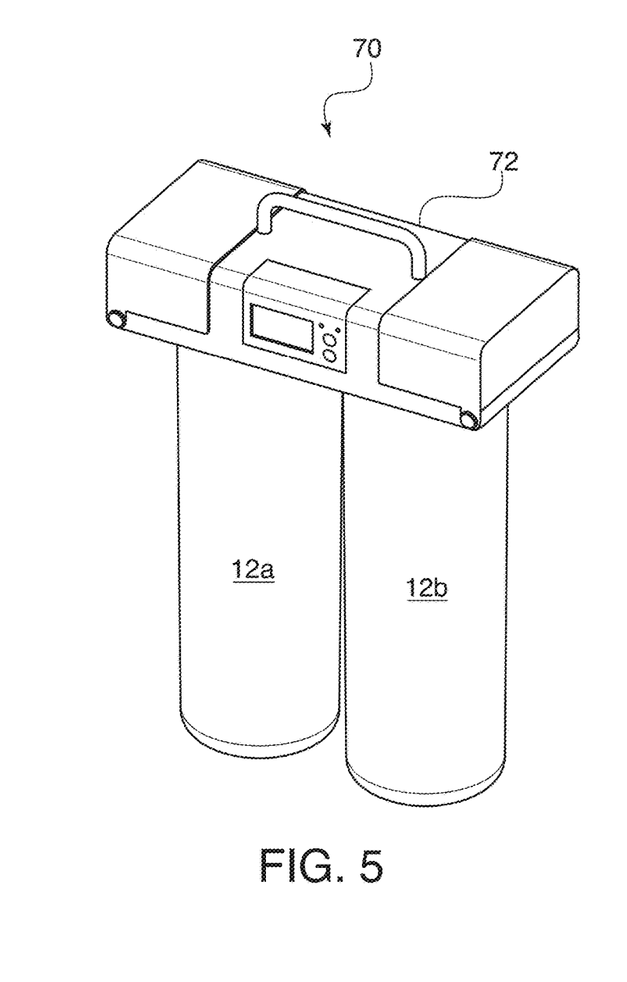
FIG. 5 illustrates a side perspective view of a dual filter system.
Figure 6:
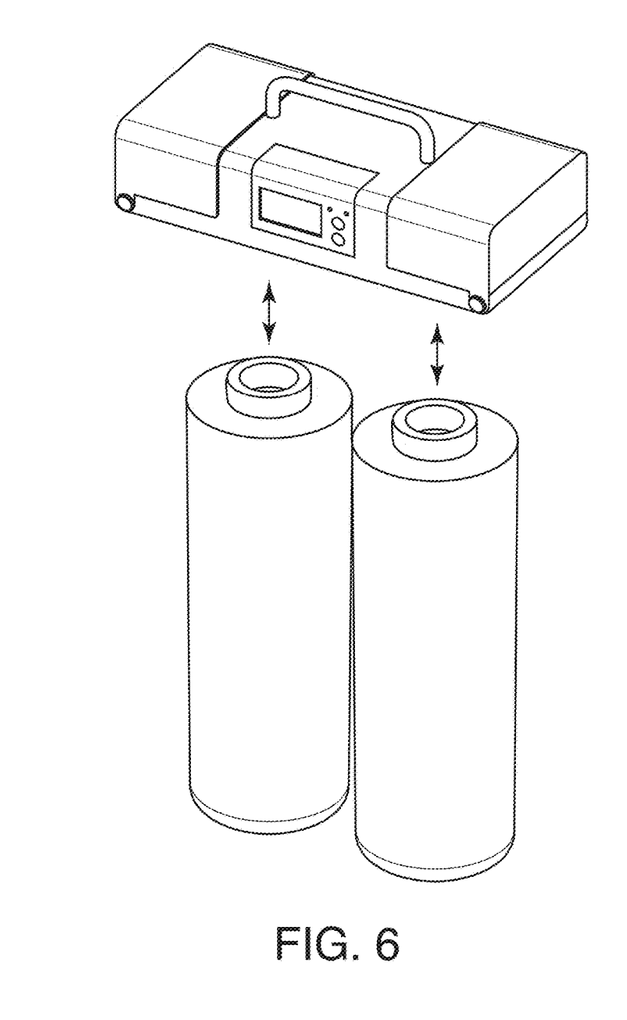
FIG. 6 illustrates a side exploded view of the dual filter system of FIG. 5.
Figure 7:
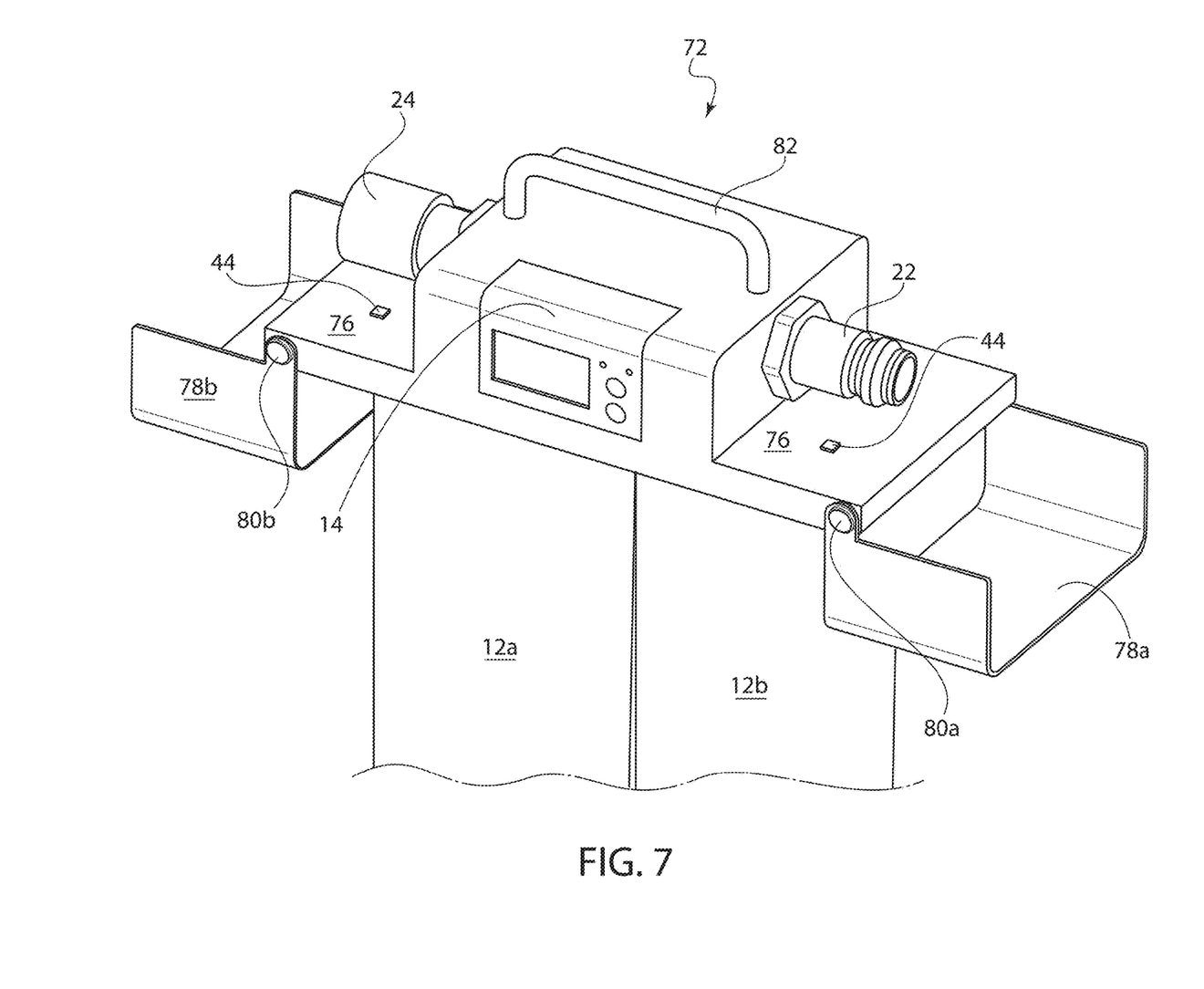
FIG. 7 illustrates a side view of a flow control unit with shields in an open position.
Figure 8:
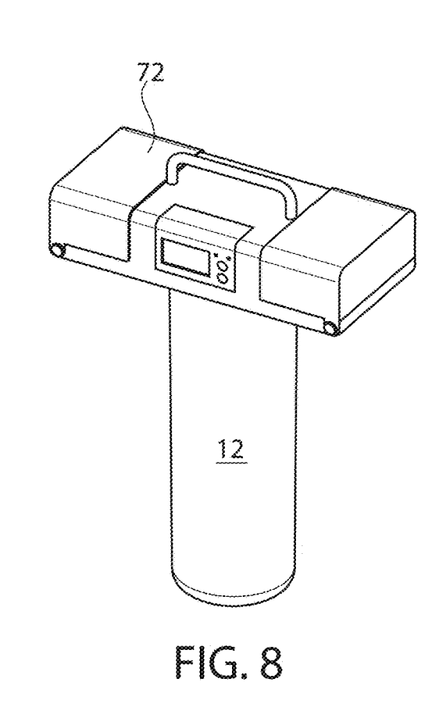
FIG. 8 illustrates a single filter system.
Figure 9:
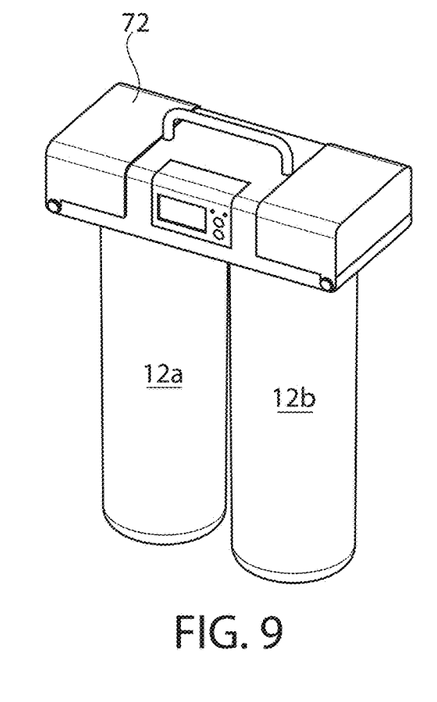
FIG. 9 illustrates a dual filter system.
Figure 10:
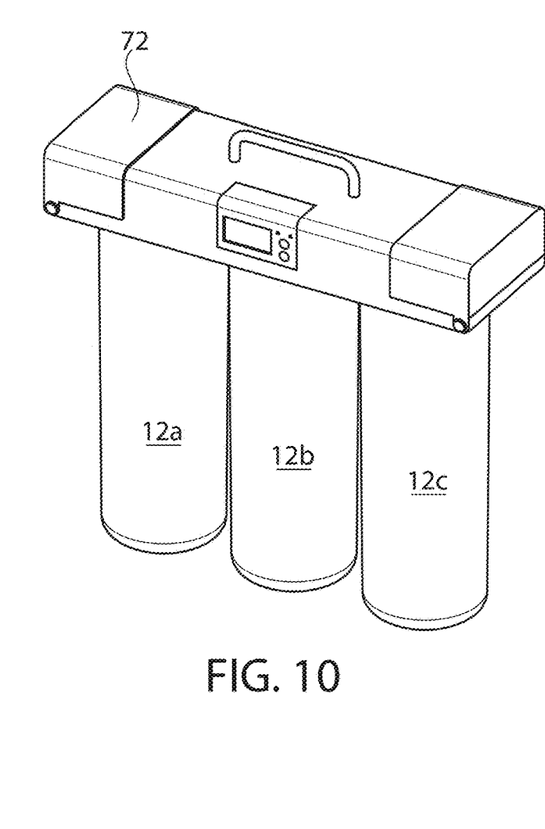
FIG. 10 illustrates a triple filter system.

In a further embodiment, a dual cylinder system 70 may be provided. The dual system 70 has more than one intraconnected water filter cartridge housing 12. Examples are illustrated by FIGS. 5-7. In the dual systems 70 shown, there are two filter cartridge housings 12a and 12b illustrated. However, it should be understood that any number of appropriate filter cartridge housings 12 may be used. For example, a single filter cartridge housing 12 may be used with the flow control unit 72. This example is illustrated by FIG. 8. FIG. 9 illustrates two side-by-side filter cartridge housings 12a, 12b connected via a single flow control unit 72. It is also possible for more than two filter cartridges 12 to be used. In various examples, three, four, five, six, seven, or even more housings 12 may be provided in association with a single flow control unit 72. One example illustrating the use of three housings 12a, 12b, 12c is illustrated by FIG. 10.

Figure 17A:
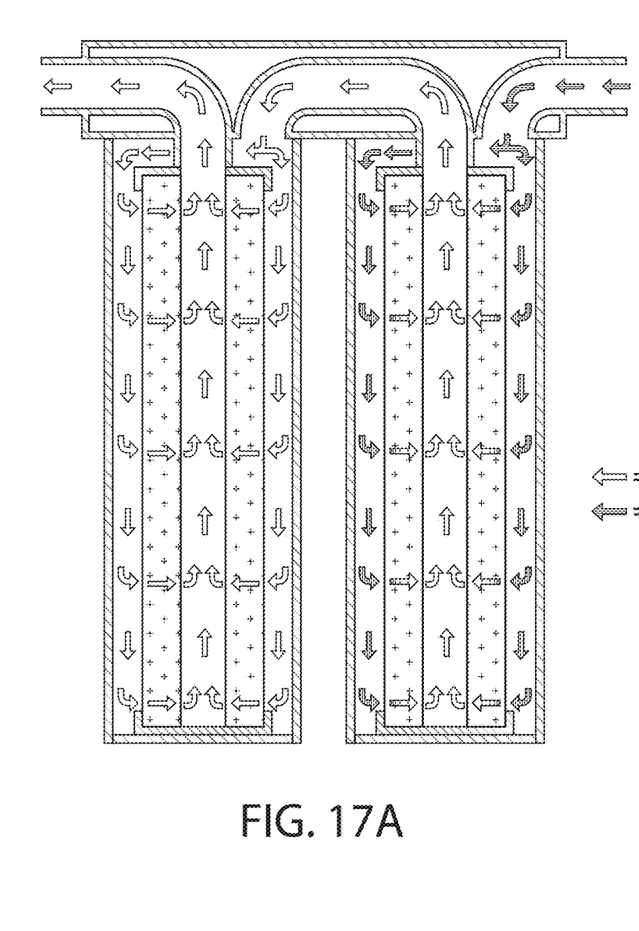
FIG. 17A illustrates a side cross-sectional view of water flow through a dual chamber system with two filters connected in series.
Figure 17B:
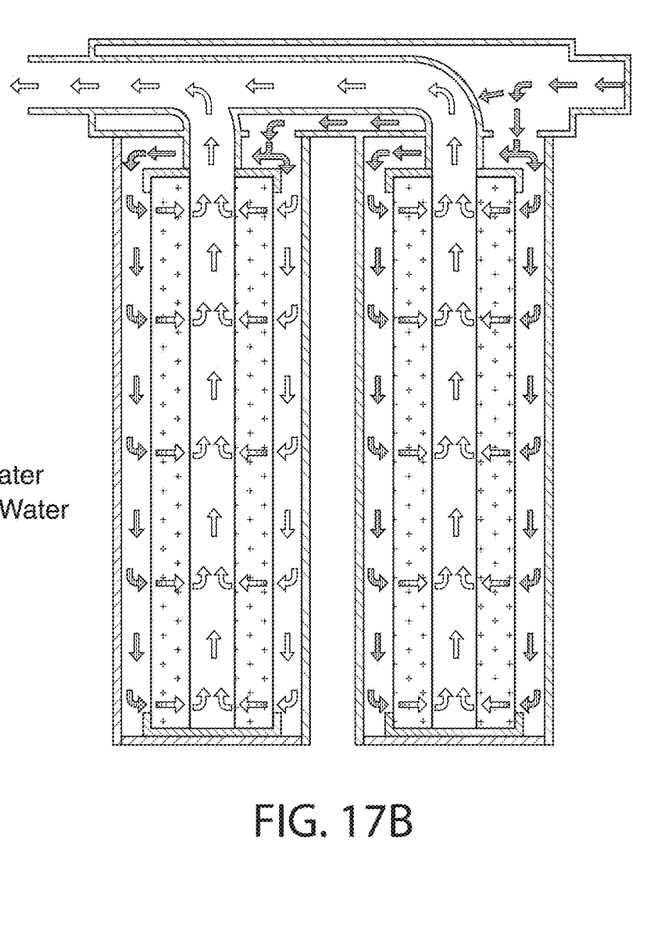
FIG. 17B illustrates a side cross-sectional view of water flow through a dual chamber system with two filters connected in parallel.

The flow control unit 72 is illustrated in more detail by FIG. 7. As shown, the flow control unit 72 has an inlet fitting adapter 20 and an outlet fitting adapter 24, similar to those described above. Flow unit 72 is also shown having an FMS 14, similar to that described above. Water to be treated flows into the inlet adapter 20, is caused to flow through filters housed by filter cartridge housings 12a and 12b, and exits through the outlet adapter 24. FIG. 17A illustrates one embodiment of water flowing through the disclosed dual chamber system, with the filters connected in series. FIG. 17B illustrates one embodiment of water flowing through the disclosed dual chamber system, with the filters connected in parallel. Arrows indicate the direction of water flow. The darkened arrows indicate untreated water, and the lightened arrows indicate treated water. Pressure from the incoming water source forces movement of the water through the system.

To keep the water inlet and outlet areas and fitting adapters free of microbial contamination for the reasons outlined above, the cavities for the inlet and outlet may be fitted with germicidal UV light source such as LEDs 44. This allows the flow control unit 72 to provide UV treatment to the adapters 20, 24. In order for this treatment to take place, one or more UV LEDs 44 are positioned on a platform 76 of the flow control unit 72. UV shields 78 are provided for safety. In the embodiment shown, a first UV shield 78a is hinged to the platform 76 at a first pivot point 80a. A second UV shield 78b is hinged to the other end of the platform 76 at a second pivot point 80b. The first UV shield 78a rotates about the first pivot point 80a in order to close and house the inlet fitting adapter 20. The second UV shield 78b rotates about the second pivot point 80b in order to close and house the outlet fitting adapter 24. The flow control unit 72 with the UV shields 78 in a closed position is as shown by FIGS. 5 and 6. There may be provided a safety switch that requires the UV shields 78 to be locked in place in order for the LEDs 44 to be switched-on. This feature prevents accidental expose to UV light source by the user.

Figure 11:
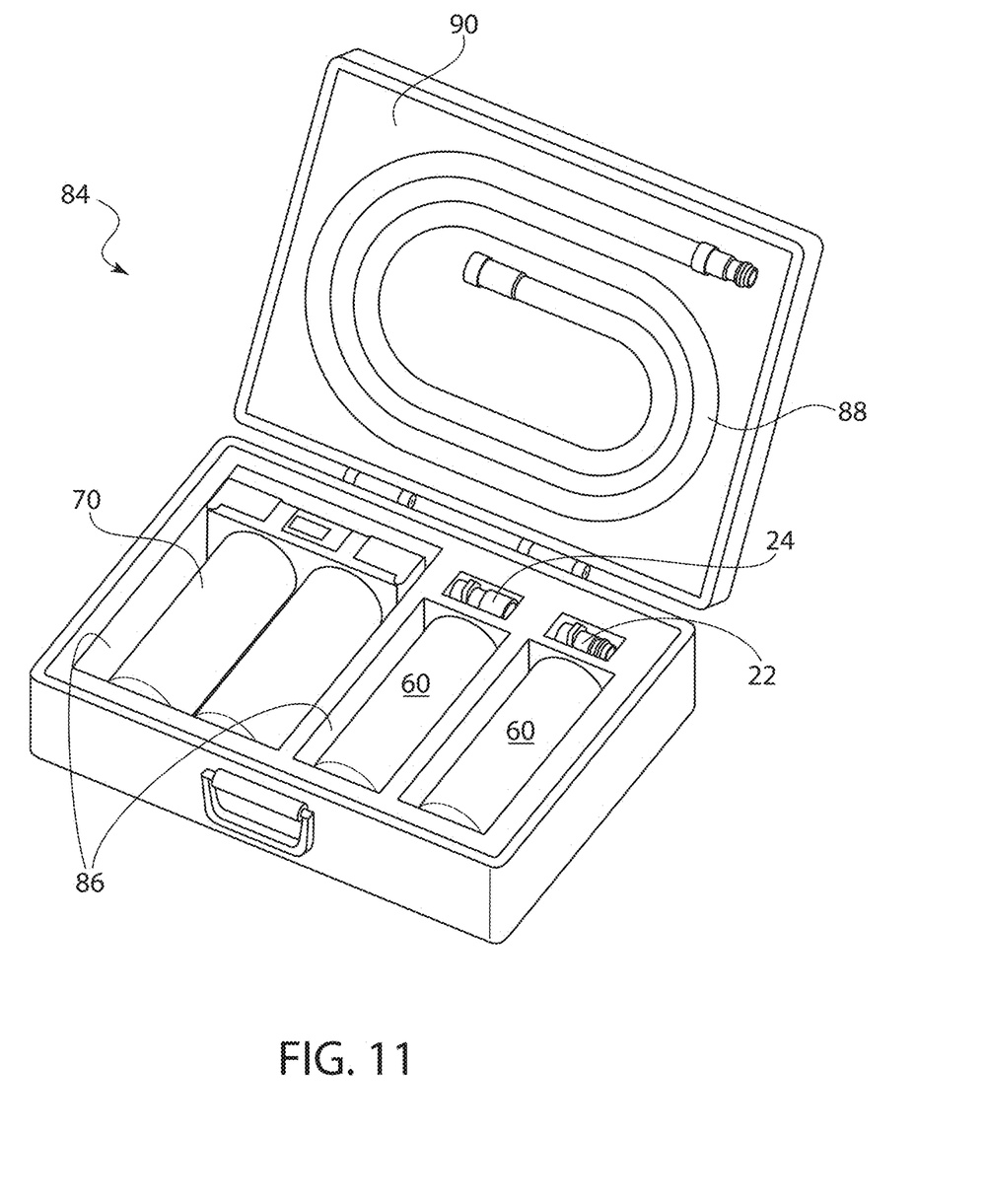
FIG. 11 illustrates a carrying case for a dual filter system.

An upper part of the flow control unit may be provided with a handle 82 in order to allow ease of carrying of the dual filter system 70. This allows the dual filter system 70 to be a carry-on package, with the user transporting the system 70 via the handle 82. As shown by FIG. 11, there may be a storage case 84 with a plurality of compartments 86 that are shaped and configured to receive replacement filters 60, conduits/hoses 88 for securing the system to an aircraft, replaceable inlet and outlet fitting adapters 20, 24, for storing system 70, or for storing any other appropriate components. The storage case lid 90 may also be used to store one or more conduits 88.

Figure 12:
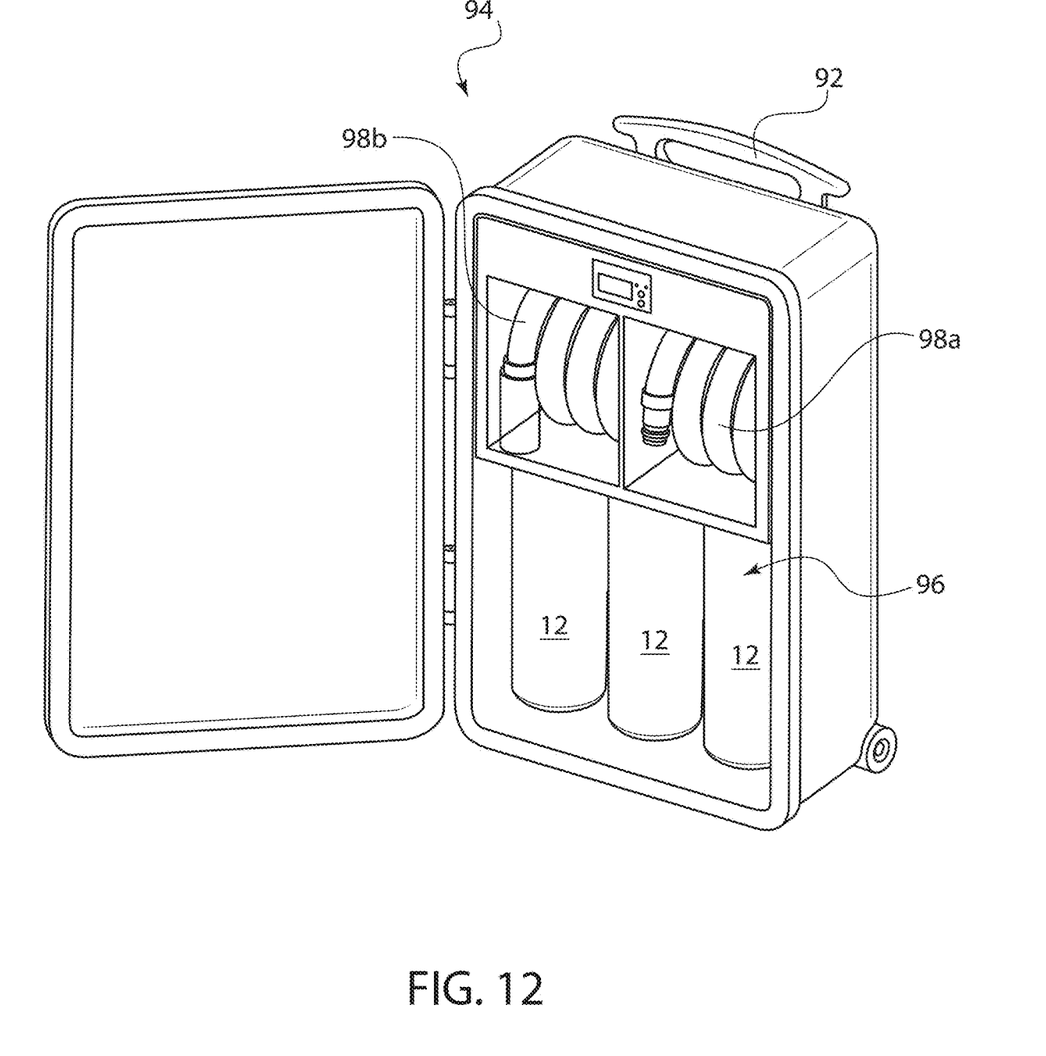
FIG. 12 illustrates a rolling case that can house a filter system.

Additionally or alternatively, a light trolley or rolling storage case 94 may be used for ease of mobility and transportation of a filter system 96. One example is illustrated by FIG. 12. In this example, the filter system components are individually housed within the case 94. For example, the filter cartridge housings 12 are mounted within the case. Retractable hoses 98 may be mounted within the case. There may be a retractable hose 98a for the inlet (where water to be treated is delivered into the system 96) and a separate retractable hose 98b for the outlet (for delivering treated water to the vehicle for upload). It is possible for hoses 98 to have fixed connections. Alternatively, it is possible for hoses 98 to have appropriately shaped adapter fittings (20, 24) as described above. Rolling case 94 may be provided with a retractable handle 92 for ease of transportation. The case 94 may be provided with an equalization valve to adjust for changes in altitude.

Any of the disclosed cases 30, 84, 94 may be sized as a carry-on size.

Figures 13A, 13B:
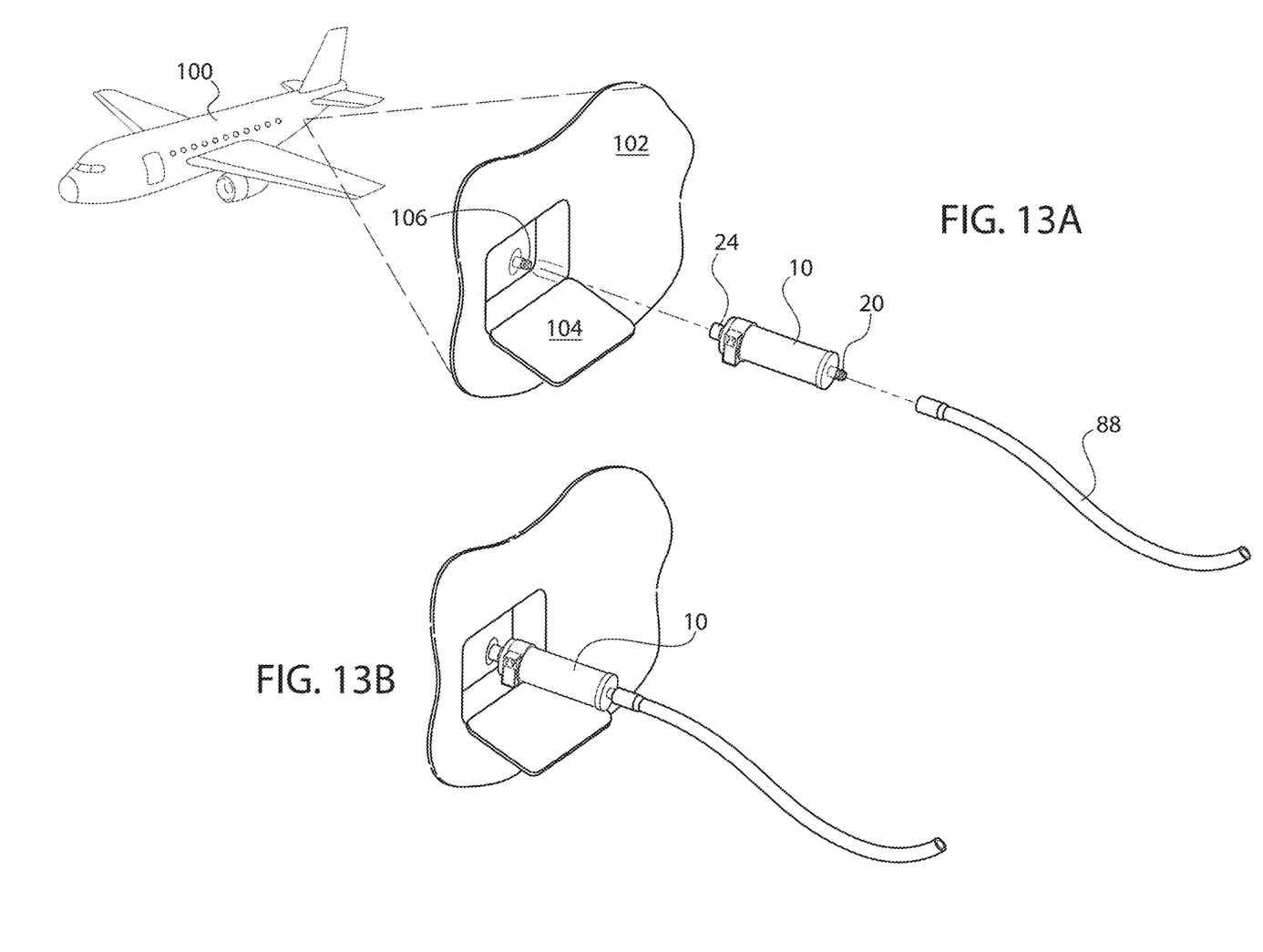
FIG. 13A illustrates a filter system being secured to an aircraft water fill inlet.
FIG. 13B illustrates the filter system of FIG. 13a in a secured configuration.
Figure 14:
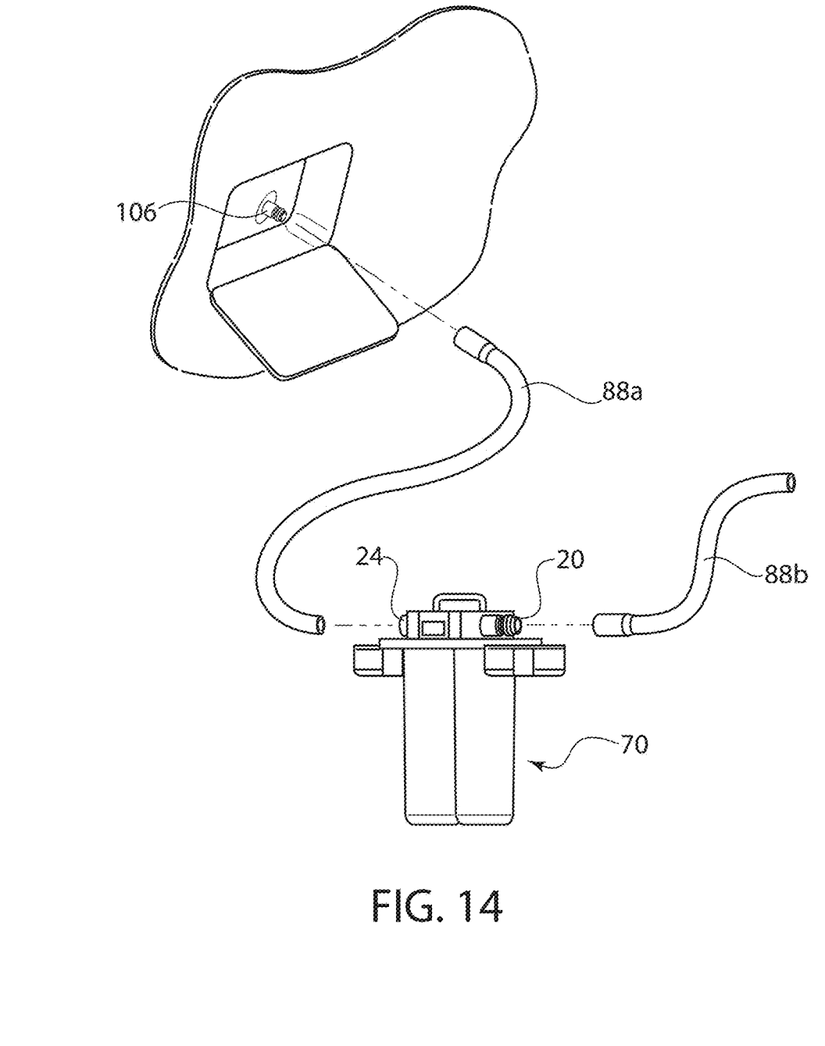
FIG. 14 illustrates a dual filter system being secured to an aircraft water fill inlet.
Figure 15:
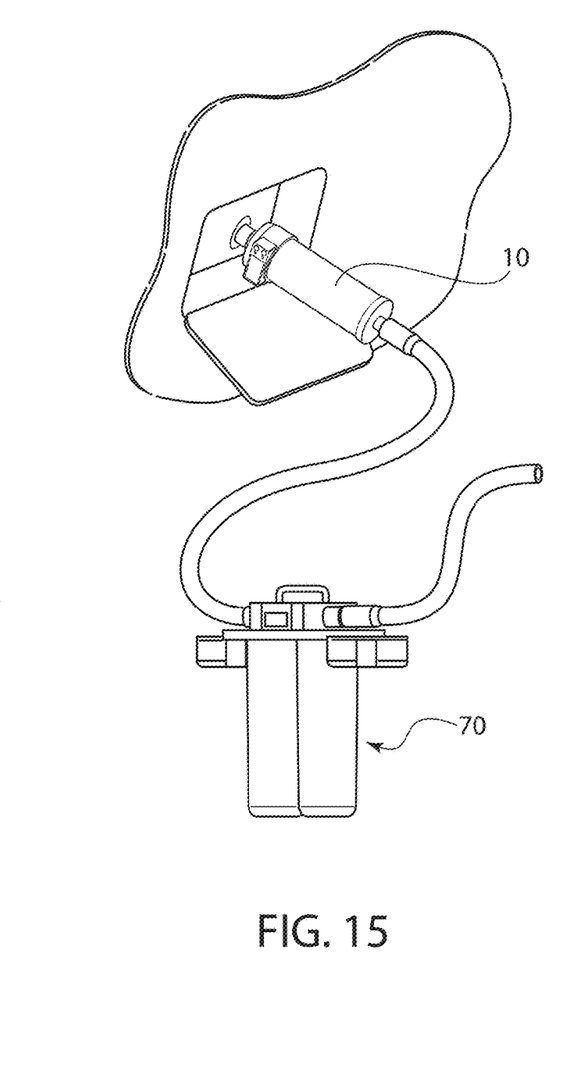
FIG. 15 illustrates two water filtration systems secured in series to an aircraft water fill inlet.

FIGS. 13-15 illustrate connection of a device 10 and/or a dual filter system 70 to an aircraft 100. In these examples, the aircraft has an aircraft skin 102 which forms the outer surface of the aircraft. The aircraft skin 102 is provided with a potable water access panel 104. The access panel 104 encloses a potable water fill inlet 106. When the panel 104 is opened, conduits 88 may be used to secure one (or more than one) of the devices 10, 70 described herein to the water fill inlet 106. In FIGS. 13a and 13b, a device 10 is secured directly to the potable water fill inlet 106 via the device outlet fitting adapter 24. (It should be understood that an intermediate conduit may be used between the inlet 106 and the outlet adapter 24 if desired.) The adapter 24 (or an adapter of an intermediate conduit, if used) is secured to the water fill inlet 106. A conduit 88 (also referred to as a water hose) is secured to the inlet adapter 20. As water flows from the conduit 88 and through the device 10, it is treated prior to being delivered to the aircraft potable water tank.

In FIG. 14, a dual system 70 is secured to the potable water fill inlet 106 via an intermediate conduit 88a. The intermediate conduit 88a is then secured to the outlet adapter 24 of the system 70. A water delivery conduit 88b is then secured to the inlet adapter 20 of the system. As water flows from the conduit 88b, through the device 70, it is treated prior to being delivered to the aircraft potable water tank.

Alternatively, a plurality of dual systems 70 may be attached in sequence, such that water purified to a first level leaving an outlet of a first dual system may be delivered to an inlet of a second dual system. Additionally or alternatively, one or more device(s) 10 with a single filter cartridge housing 12 may be used in combination with one or more dual systems 70. An example of this configuration is illustrated by FIG. 15.

In each of these examples, the filtration is a passive filtration that does not require chemicals or UV light treatment of the water itself. The passive filtration occurs outside the aircraft, with the device 10 or system 70 being secured to an external water fill inlet 106. This is in contrast to prior art systems that require a water treatment device to be permanently mounted on and travel with the vehicle. The present disclosure provides a portable solution for providing potable water filtration. In addition to using any combination of device 10 or system 70, it is also possible to combine use of the passive filtration of this disclosure with one or more active filtration devices, as described in more detail below.

In summary, the present disclosure relates to treatment and purification of drinking water prior to upload to the aircraft potable drinking water tank. The device travels onboard the aircraft and flies with the aircraft from one destination to another, while it is safely stored in its housing/case when not in use. The device has the necessary valves, adaptors and fittings for connection and disconnection to drinking water sources, such as water-hoses from a water delivery truck. Necessary valves, adapters and fittings are also provided for connection of the device to the aircraft water in-take panel. During the treatment process, the filtration device or system is located outside the aircraft. Once upload of water is completed, the device is disconnected and stored in its carrying case onboard the aircraft. As described herein, the carrying case may be fitted with germicidal one or more UV LEDs that can be switched on in order to irradiate any microbial species that might have been picked up from the outside environment during the connection and disconnection process. The use of UV LEDs can help safeguard the cleanliness of the parts inside the carrying case and ensures readiness for the next water upload operation. By contrast, existing water treatment systems are primarily permanently fixed/mounted to the water upload location. They do not provide portability or adjustability of adapters and are limited to the facilities given at an airport and resources available on the aircraft flight destination.

The disclosed portable water treatment filtration device is used when drinking water is uploaded to the aircraft. Its use is independent of the available facilities in a given airport and its regional water quality and purity. This offers the opportunity to meet the water purity standards per the US EPA and WHO protocols.

The device 10, 70 is described as a primarily passive filtration device. However, the device 10, 70 disclosed herein may be used in combination with other upload treatment systems. It is possible to combine use of the disclosed passive filtration device 10 with other types of filtration devices, such as one or more additional passive filtration devices and/or one or more active filtration devices. The portability of the disclosed device also allows its use to modify the performance of any other water treatment units/devices which are considered as fixed installations on-board the aircraft. For example, the disclosed device 10, 70 can be used in series with other water treatment systems on board the aircraft. In one example, rather than being mounted directly to the water fill inlet 106, the disclosed device 10, 70 may be hooked up to an on-board UV or chemical water treatment system. In this configuration, water leaving device 10, 70 is exposed to its passive filtration, and can then undergo active filtration via the other system. This type of supplemental water treatment can have advantage of power saving, reduction in the size and envelope of the device as well as their fit, form and function, and enhanced water filtration treatment. (Non-limiting examples of active filtration devices are UV filtration devices, chemical filtration devices, oxidizers, any other appropriate active filtration system, or any combination thereof.) Non-limiting examples of such active filtration are described above in the assignee's patent portfolio. The synergy between the filtration systems can help improve filtration and increase efficiency. For example, use of the disclosed passive filtration with one or more active filtration systems can help reduce the size of the active filtration system that is mounted on the aircraft.

The present assignee also a patent portfolio that is directed to water treatment within the water tank (U.S. Pat. No. 10,266,426), water treatment along or in-line with water distribution lines (U.S. Pat. No. 9,376,333), as well as water treatment at the point of use (U.S. Pat. No. 9,260,323), (e.g., water treatment systems mounted within lavatory cabinets), as well as others. These water treatment technology systems may be used in connection with the present disclosure in order to treat and disinfect water that is held in the water tank on an on-going basis, after it has been treated upon upload using the methods and device 10 described herein.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A water filtration system for a vehicle, the system comprising:

a filtration chamber housing comprising an inlet and an outlet, wherein the filtration chamber housing is configured to receive a removable filter;

a plurality of inlet fitting adapters that allow the inlet to receive upload water from differently-sized water delivery conduits;

a filtration monitoring system; and a carrying case with a UV system to treat components of the water filtration system when not in use, the carrying case adapted to house the filtration chamber housing and the plurality of inlet fitting adapters when the water filtration system is not in use.

2. The system of claim 1, further comprising a plurality of outlet fitting adapters.

3. The system of claim 1, wherein the filter comprises a polymer-based material for passive filtration.

4. The system of claim 1, wherein the carrying case comprises at least one space holder configured to receive the filtration chamber housing, the space holder comprising at least one UV LED, a closeable door, and a safety switch that only allows the UV LED to be activated only when the closable door is closed.

5. The system of claim 1, wherein the filtration monitoring system comprises a screen with a plurality of indicators.

6. The system of claim 1, wherein the water filtration system comprises a plurality of filtration chamber housings.

7. The system of claim 1, wherein the water filtration system is mounted in series with a second water treatment system.

8. The system of claim 7, wherein the second water treatment system comprises an active filtration system mounted on board the vehicle.

9. The system of claim 1, wherein the filtration chamber housing and the plurality of inlet fitting adapters are disconnected when the water filtration system is not in use and housed within the case.

10. A dual filter water treatment system, comprising:
at least two filtration chamber housings;
a flow control unit secured to the housings, the flow control unit defining a platform that supports an inlet, an outlet, at least one UV LED, and UV shields, wherein the UV shields comprise a first UV shield hinged to the platform at a first pivot point and configured to cover the inlet, and a second UV shield hinged to the platform at a second pivot point and configured to cover the outlet.

11. The system of claim 10, further comprising a case configured to house the dual filter water treatment system.

* * * * *